United States Patent
Rahman

(10) Patent No.: US 11,296,977 B2
(45) Date of Patent: *Apr. 5, 2022

(54) ANALYTICS ENABLED RADIO ACCESS NETWORK (RAN)-AWARE CONTENT OPTIMIZATION USING MOBILE EDGE COMPUTING

(71) Applicant: AT&T INTELLECTUAL PROPERTY I, L.P., Atlanta, GA (US)

(72) Inventor: Moshiur Rahman, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/904,638

(22) Filed: Jun. 18, 2020

(65) Prior Publication Data

US 2020/0322255 A1   Oct. 8, 2020

Related U.S. Application Data

(63) Continuation of application No. 16/230,996, filed on Dec. 21, 2018, now Pat. No. 10,728,138.

(51) Int. Cl.
*H04L 12/707* (2013.01)
*H04B 7/185* (2006.01)
(Continued)

(52) U.S. Cl.
CPC ......... *H04L 45/22* (2013.01); *H04B 7/18584* (2013.01); *H04L 65/605* (2013.01);
(Continued)

(58) Field of Classification Search
CPC ..... H04L 45/22; H04L 65/605; H04L 69/163; H04L 69/22; H04L 45/70; H04L 47/822;
(Continued)

(56) References Cited

U.S. PATENT DOCUMENTS

| 5,812,526 A | 9/1998 | Chang et al. |
| 9,088,577 B2 | 7/2015 | Zhu et al. |

(Continued)

FOREIGN PATENT DOCUMENTS

| CN | 107911478 A | 4/2018 |
| WO | 2007085172 A1 | 8/2007 |

(Continued)

OTHER PUBLICATIONS

Non-Final Office Action received for U.S. Appl. No. 16/230,996 dated Jan. 27, 2020, 11 pages.

(Continued)

*Primary Examiner* — Shailendra Kumar
(74) *Attorney, Agent, or Firm* — Amin, Turocy & Watson, LLP

(57) ABSTRACT

A central analytics server can be utilized to analyze health data associated with one or more radio access networks (RANs) that has been aggregated from one or more mobile edge computing (MEC) servers, to determine throughput available at a radio link interface associated with a user equipment (UE). Further, the central analytics server can determine, based on the available throughput, a recommendation for an action that can be performed by a content server to optimize content delivery to the UE. In an example, the central analytics server can convey the recommendation to the content server(s) via a "window size" field within a header segment of a transmission control protocol (TCP) via in-band and/or out-of-band signaling. In one aspect, the recommendation can comprise instructions to adapt a bit stream and/or comprise instructions indicative of an optimal data transmission route.

20 Claims, 11 Drawing Sheets

(51) Int. Cl.
*H04L 29/06* (2006.01)
*H04W 28/02* (2009.01)
*H04W 92/10* (2009.01)
*H04L 45/00* (2022.01)
*H04L 69/163* (2022.01)
*H04L 69/22* (2022.01)
*H04L 65/60* (2022.01)

(52) U.S. Cl.
CPC ............ *H04L 69/163* (2013.01); *H04L 69/22* (2013.01); *H04W 28/0236* (2013.01); *H04W 28/0268* (2013.01); *H04W 92/10* (2013.01)

(58) Field of Classification Search
CPC . H04L 65/4084; H04L 65/80; H04B 7/18584; H04W 28/0236; H04W 28/0268; H04W 92/10
See application file for complete search history.

(56) References Cited

U.S. PATENT DOCUMENTS

| | | | |
|---|---|---|---|
| 9,380,635 | B2 | 6/2016 | Chisu et al. |
| 9,439,106 | B2 | 9/2016 | Bedekar et al. |
| 9,906,340 | B2 | 2/2018 | Prasad et al. |
| 9,917,878 | B2 | 3/2018 | Gell et al. |
| 10,037,231 | B1 * | 7/2018 | Jakhetiya ............ H04L 67/2847 |
| 10,038,639 | B2 | 7/2018 | Francini et al. |
| 2013/0258865 | A1 | 10/2013 | Kovvali et al. |
| 2014/0198643 | A1 | 7/2014 | Conway et al. |
| 2015/0381756 | A1 | 12/2015 | Lotfallah et al. |
| 2016/0080965 | A1 | 3/2016 | Boyle et al. |
| 2017/0041238 | A1 | 2/2017 | Do et al. |
| 2017/0064037 | A1 | 3/2017 | Das et al. |
| 2017/0064591 | A1 | 3/2017 | Padfield et al. |
| 2017/0244639 | A1 | 8/2017 | Szilagyi et al. |
| 2017/0257289 | A1 | 9/2017 | Cui et al. |
| 2018/0041958 | A1 * | 2/2018 | Narayanan .............. H04L 65/80 |
| 2018/0160330 | A1 | 6/2018 | Frydman et al. |
| 2018/0295098 | A1 * | 10/2018 | Yuzawa .............. H04L 61/2007 |
| 2018/0367637 | A1 | 12/2018 | Balazinski et al. |
| 2019/0132767 | A1 | 5/2019 | Shi et al. |
| 2020/0053546 | A1 * | 2/2020 | Panchal ................ H04L 45/306 |
| 2020/0195539 | A1 * | 6/2020 | Sivaraj .................. H04L 41/145 |
| 2021/0084525 | A1 * | 3/2021 | Takano ............ H04W 72/0486 |

FOREIGN PATENT DOCUMENTS

| | | |
|---|---|---|
| WO | 2010060106 A1 | 5/2010 |
| WO | 2017084723 A1 | 5/2017 |
| WO | 2018012858 A1 | 1/2018 |
| WO | 2018031070 A1 | 2/2018 |
| WO | 2018046090 A1 | 3/2018 |
| WO | 2018082988 A1 | 5/2018 |

OTHER PUBLICATIONS

Sharma, et al. "Edge Computing: Needs, Concerns and Challenges", International Journal of Scientific & Engineering Research, vol. 8, Iss. 4, (Apr. 2017). pp. 154-166.

Ku, et al. "Mobile edge computing enhanced adaptive bitrate video delivery with joint cache and radio resource allocation", IEEE Access 5 (2017): pp. 16406-16415.

Jain, et al. "Mobile throughput guidance inband signaling protocol", IETF, work in progress, Mar. 2017. 16 pages.

Hu, et al. "Mobile edge computing-A key technology towards 5G", ETSI white paper 11.11 (2015): pp. 1-16.

Brown. "Mobile edge computing use cases and deployment options", Juniper White Paper (2016): pp. 1-10.

Enable Next-Gen Services With Multi-Access Edge Computing VMware, 2017, 4 pages.

* cited by examiner

ANALYTICS ENABLED RADIO ACCESS NETWORK (RAN)-AWARE CONTENT OPTIMIZATION USING MOBILE EDGE COMPUTING

RELATED APPLICATION

The subject patent application is a continuation of, and claims priority to, U.S. patent application Ser. No. 16/230,996 (now U.S. Pat. No. 10,728,138), filed Dec. 21, 2018, and entitled "ANALYTICS ENABLED RADIO ACCESS NETWORK (RAN)-AWARE CONTENT OPTIMIZATION USING MOBILE EDGE COMPUTING," the entirety of which application is hereby incorporated by reference herein.

TECHNICAL FIELD

The subject disclosure relates to wireless communications, e.g., a system and method for analytics enabled radio access network (RAN)-aware video optimization using mobile edge computing.

BACKGROUND

The rapid growth in mobile communication has resulted in an exponential increase in traffic within mobile networks that has created several challenges for mobile network operators (MNOs). Additionally, new high-demand services and applications have emerged due to the evolution of user equipment (UEs). To conserve UE resources, these high-demand services and applications can be offloaded to a conventional centralized cloud (CC). However, this option can cause a significant execution delay, which is substantially increased in congested networks and is unsuitable for real-time applications.

To prevent delays, mobile edge computing (MEC) can be utilized, wherein computation and storage resources provided at an edge (e.g., radio access network (RAN)) of the mobile network, can be utilized to execute the high-demand services and applications while satisfying strict latency criteria. The MEC can employ content caching and/or context awareness mechanisms to improve the service providing ability of the RAN. Moreover, the MEC environment is characterized by ultra-low latency and high bandwidth as well as real-time access to radio network information that can be leveraged by the applications. MNOs can provide authorized third-parties access to their RAN edge allowing them to flexibly and rapidly deploy innovative applications and services towards mobile subscribers, enterprises, and vertical segments.

The above-described background relating to mobility networks is merely intended to provide a contextual overview of some current issues and is not intended to be exhaustive. Other contextual information may become further apparent upon review of the following detailed description.

DETAILED DESCRIPTION

Figure 1:
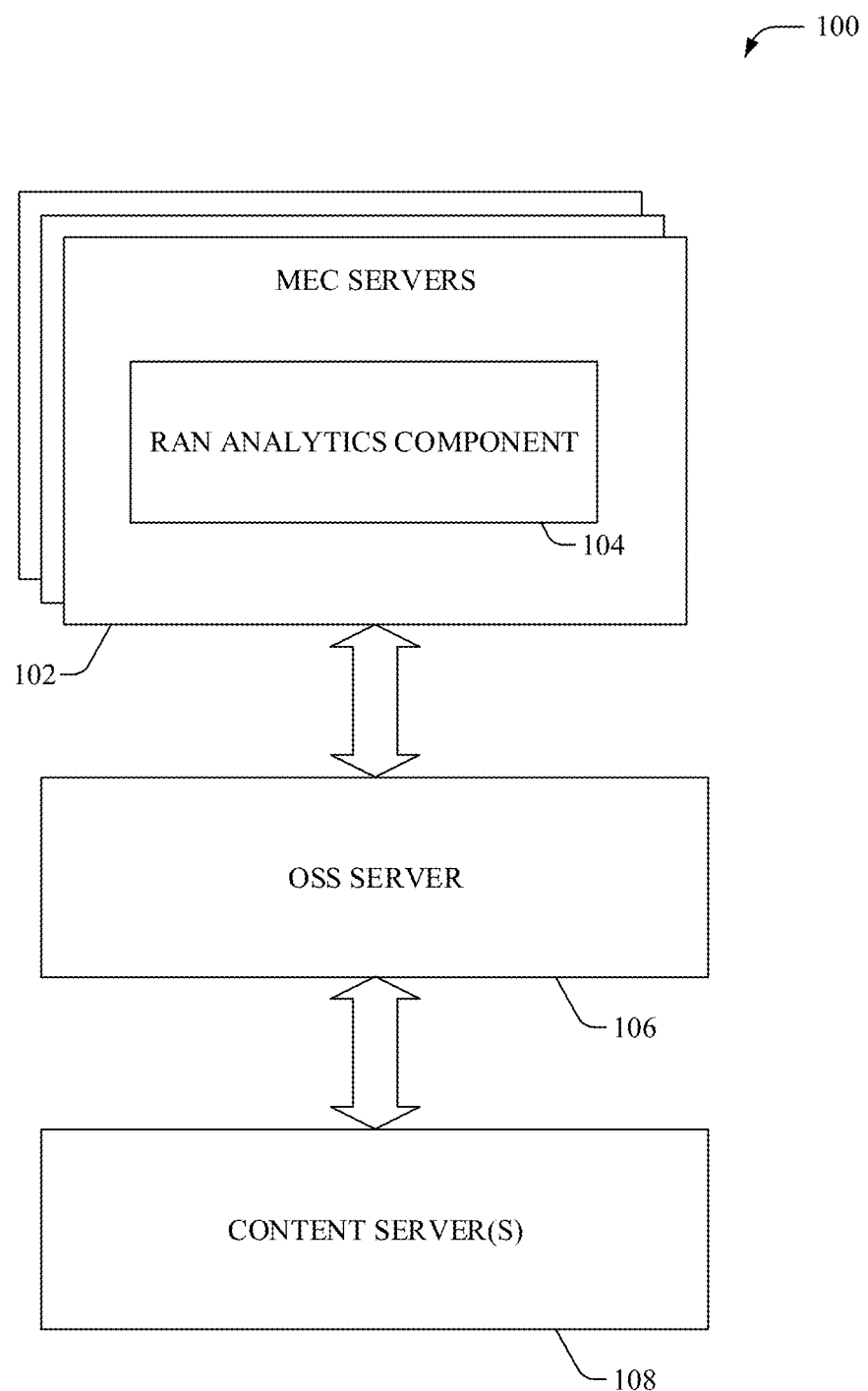
FIG. 1 illustrates an example system that facilitates analytics enabled radio access network (RAN)-aware content optimization.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," "point," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

Further, it is noted that the term "cloud" as used herein can refer to a set of servers, communicatively and/or operatively coupled to each other, that host a set of applications utilized for servicing user requests. In general, the cloud computing resources can communicate with user devices via most any wired and/or wireless communication network to provide access to services that are based in the cloud and not stored locally (e.g., on the user device). A typical cloud computing environment can include multiple layers, aggregated together, that interact with each other to provide resources for end-users.

Aspects or features of the disclosed subject matter can be exploited in substantially any wired or wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Fifth generation (5G) and/or other future telecommunication technologies, Zigbee, or another IEEE 802.XX technology, low power wide area (LPWA) and/or non-3GPP standard based solutions, such as, but not limited to, Ingenu, Sigfox, and/or LoRa, etc. Additionally, substantially one or more aspects of the disclosed subject matter can be exploited in legacy (e.g., wireline) telecommunication technologies.

As the development of mobile communication continues to rapidly increase, wireless data traffic has observed an explosive growth. In addition, the demand for applications and/or services that have high-capacity and/or low-latency requirements has also increased. To meet the high-capacity and/or low-latency requirements, MNO can deploy mobile edge computing (MEC; also referred to as multi-access edge computing) to provide cloud computing capabilities and an IT service environment at the edge of a communication network (e.g., cellular network). The European Telecommunications Standards Institute (ETSI) specifies that MEC can be a part of the eNodeB (eNB) or can be run on an external server that is deployed between the eNB and the mobile core network on an S1 interface. However, the conventional MEC lacks QoS and/or disaster recovery mechanisms.

In one or more embodiments, systems and methods disclosed herein provide a central analytics server (e.g., operations support systems (OSS) server) that has a global view of the communication network and its interfaces. The central analytics server can analyze health data associated with one or more radio access networks (RANs) that has been received from one or more MEC servers, to determine throughput available at a radio link interface. Further, the central analytics server can determine, based on the available throughput, a recommendation for an action that can be performed by a content server to optimize content delivery. In an example, the central analytics server can convey the recommendation to the content server(s) via a receive window field (e.g., utilized for flow control) within a segment of a transmission control protocol (TCP) header via in-band and/or out-of-band signaling. In one aspect, the recommendation can comprise instructions to adapt a bit stream and/or comprise instructions indicative of an optimal (and/or preferred) content delivery route.

Referring initially to FIG. 1, there illustrated is an example system 100 that facilitates analytics enabled RAN-aware content optimization, according to one or more aspects of the disclosed subject matter. System 100 can be utilized within a communication network (e.g., cellular network) that facilitates MEC, wherein computing, storage and/or communication resources, deployed at a network edge, can provide detailed analytics data on the network, the customer premises equipment (CPE), and/or the user equipment (UE). In one aspect, MEC servers 102 can be deployed at the edge of a mobile network, for example, coupled to (and/or be part of) an access point, RAN controller, etc. and can be utilized to provide new services by opening the RAN edge. As an example, the MEC servers 102 can run virtualized software on commercial off-the-shelf (COTS) hardware housed within a secure form factor. With the proliferation of new wireless technologies and next generation mobile devices, connectivity and communication models can be expected to rapidly evolve and drive the adoption of new services which were not possible before. Moreover, as network functions transform from a physical to a virtual domain (e.g., in a cloud centric environment), innovative opportunities can be created to be able to design fully programmable mobile networks, for example, network that can deliver a micro-service architecture. Programmable or adaptive network technology concepts can be applied to core networks and can be extended to radio access networks.

In an aspect, the MEC servers 102 can be deployed across one or more different (or the same) types of RANs (e.g., HetNets) that utilize different (or the same) radio access technologies (RATs). Typically, the MEC servers 102 can facilitate content caching and/or execution of services and/or applications of authorized service providers to provide an ultra-low latency, high bandwidth, and/or real-time access to radio network information. Further, MEC servers 102 can be utilized to monitor data associated with various network elements, such as, but not limited to, user equipment (UE), RAN devices, radio interface, etc.

According to an embodiment, a RAN analytics component 104 can be utilized to determine (and/or predict via machine learning) information associated with the RAN, such as, but not limited to, RAN health data and/or status, current loading of a cell and/or neighboring cells, a direction of UE movement through the cell, a predicted movement of a UE to the cell edge, information and/or status of UE (e.g., type and model/make of device, battery status, screen size, memory available, caching, traffic pattern, applications/service utilized etc.). Further, the RAN analytics component 104 can determine statistics pertaining to quality of service (QoS), quality of experience (QoE), bandwidth availability and/or utilization, capacity, and/or throughput at a radio downlink interface for a UE. As an example, the RAN analytics component 104 can monitor and/or collect information at most any time, such as, but not limited to, periodically, at a defined time, in response to an event, based on instructions received from an OSS server 106, etc.

According to an aspect, the OSS server 106 can comprise a central analytics server, for example, deployed within a core network cloud of the cellular network, that can receive and analyze the information from the RAN analytics component 104 (from one or more of the MEC servers 102). As an example, the information can be transmitted via a 16-bit receive window field of a transmission control protocol (TCP) header that is typically utilized for flow control data. Moreover, the information can be transmitted via in-band and/or out-of-band (e.g., Satellite) communication and can accordingly support disaster recovery logic.

Based on an analysis of the received information, the OSS server 106 can determine an action that can be performed by one or more content servers 108 to optimize delivery of content (e.g., to satisfy defined criteria associated with QoS, QoE, etc.). For example, OSS server 106 can determine adjustments that can be made to a transmission of the content to maintain defined quality parameters. Additionally, alternatively, the OSS server 106 can determine one or more alternate distribution paths for content delivery. In one aspect, the OSS server 106 can transmit the recommendations to the content server via the 16-bit receive window field of the TCP header that is typically utilized for flow control data. Moreover, the recommendations can be transmitted via in-band and/or out-of-band (e.g., satellite) communication and can thus support disaster recovery logic.

The content server(s) 108 can perform the recommended actions based the information conveyed in the TCP header. For example, the content server(s) 108 can adjust the data transmission to the UE to maintain the quality in-band or out-of-band (e.g., satellite) communication. In another example, the content server(s) 108 can utilize an alternate transmission route to facilitate content delivery and accordingly conform to the service level agreement (SLA).

MEC can complement software-defined networking (SDN) and network function virtualization (NFV) to facilitate the evolution to next generation networks (e.g., 5G networks) that can be highly resource intensive in terms of handling mobile-to-mobile, Internet of things (IoT), augmented/virtual reality (AR/VR), tele-health, targeted mobile advertising, connected cars, and/or other new services/technologies. These new services/technologies can require a wide range of aggregate bit rates, low latencies, device types and/or device capabilities, device densities, etc., to provide consistent end user quality for a given service in a heterogeneous networking environment. Moreover, utilization of the system 100 can help satisfy the demanding requirements for these services/technologies (e.g., content delivery services) with regards to expected throughput, latency, scalability, and/or automation.

Figure 2:
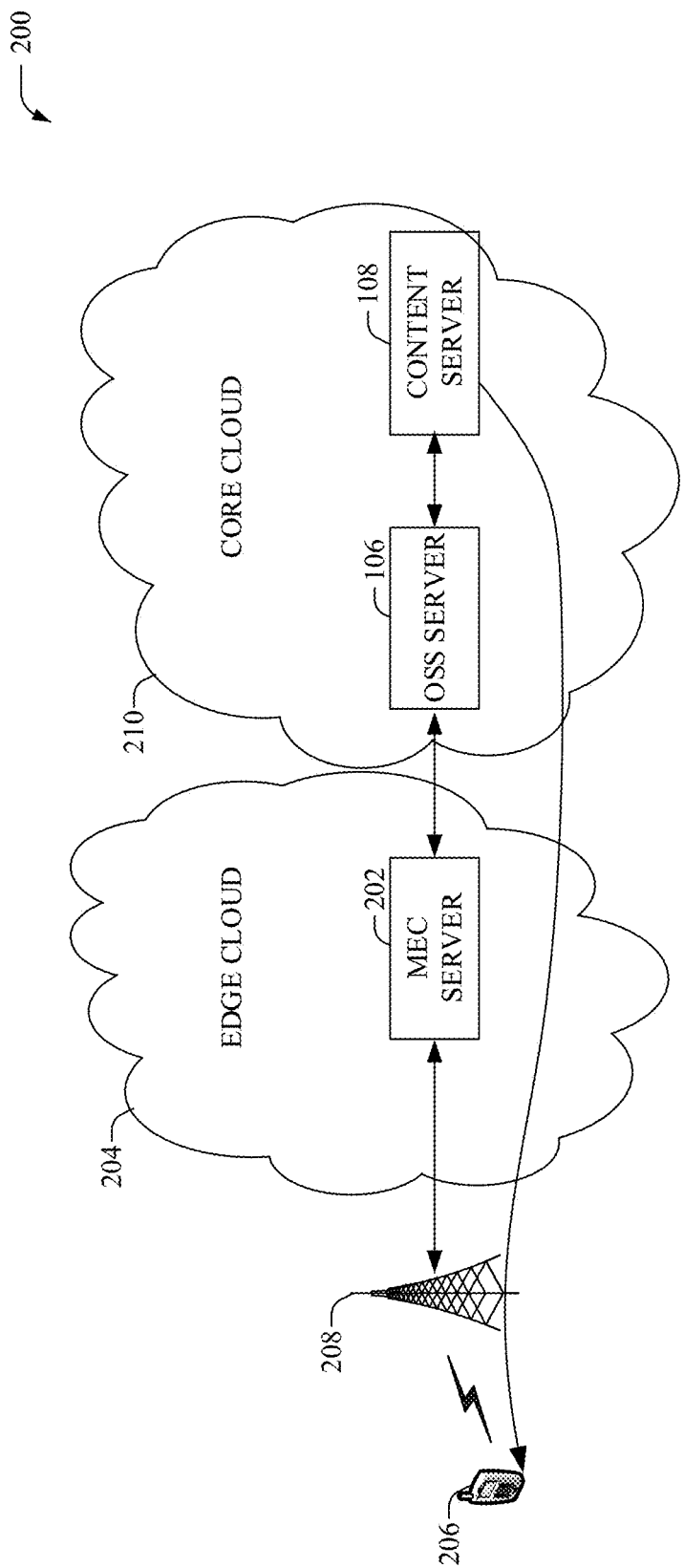
FIG. 2 illustrates an example system for controlling, via in-band signaling, content delivery parameters that have been determined based on RAN analytics.

Referring now to FIG. 2, there illustrated is an example system 200 for controlling, via in-band signaling, content delivery parameters that have been determined based on RAN analytics, in accordance with an aspect of the subject disclosure. In one aspect, the system 200 utilizes MEC server 202 deployed within an edge cloud 204 that provides cloud-computing capabilities and an IT service environment at the edge of a cellular network. Deploying the MEC server 202 within the edge cloud 204 enables the MNO to provide, through edge analytics, a better customer experience by enabling services that have lower latency, higher throughput, and/or are more diverse, localized, and/or personalized. It is noted that the MEC server 202 can be substantially similar to MEC servers 102 and can comprise functionality as more fully described herein, for example, as described above with regard to MEC servers 102.

According to an aspect, the MEC server 202 can determine and/or estimate (e.g., by employing RAN analytics component 104) a bandwidth and/or throughput available and/or likely to be available at a radio downlink interface for UE 206 that is served by access point 208 (e.g., eNB, HomeNodeB, gNB, base station, etc.). As an example, the MEC server 202 can perform measurements with respect to most any RAN performance parameters, such as, but not limited to, bandwidth, throughput, capacity, load, packet loss, out of sequence, delay/latency, health of a link, etc. Moreover, the measurements can be performed periodically, in response to an event, based on a request/instruction from the OSS server 106, etc. Further, in this example embodiment, the measured data can be transmitted to the OSS server 106 via in-band signaling (e.g., within a 16-bit receive window field of a TCP header that is used for flow for control).

According to an embodiment, the OSS server 106 can analyze the measured data to identify optimal data transmission parameter(s) and/or route(s) for content delivery (e.g., streaming video, audio, etc.). Moreover, the OSS server 106 is deployed centrally within a core cloud 210 and thus, has a global view of the network and its interfaces, connection availability, and/or alternate route availability. Further, the OSS server 106 can determine current and/or future (e.g., predicted) bandwidth availability view by leveraging a built-in analytics functionality that can be utilized to perform trending analysis to have future rules for the available bandwidth predictability. Based on the determined bandwidth availability and/or other performance parameters associated with the RAN, the OSS server 106 can determine optimal data routing path that can be utilized to facilitate content delivery. In one aspect, the OSS server 106 can store a table of all the alternate distribution paths, comprising, but not limited to, wireless, cable, powerline and/or satellite communication channels that can be utilized to deliver content from content server 108 to the UE 206 and based on the determined bandwidth and/or other performance parameters of the paths, the OSS server 106 can select one (or more) of the distribution paths for routing the content to the UE 206.

As an example, the OSS server 106 can communicate the determined information (e.g., bandwidth availability and/or alternate distribution route(s)) to the content server 108 via in-band signaling (e.g., within a 16-bit receive window field of a TCP header that is used for flow for control). The content server 108 can utilize the information to adapt the byte stream to satisfy QoS and/or SLA. According to an aspect, the information transmitted to the content server 108 conveys the RAN's overall health (e.g., available capacity, available bandwidth, etc.) determined based on observed and/or forecasted traffic demand. RAN health can be determined (e.g., by the OSS server 106) in many ways, such as, but not limited to utilizing the statistics of a specific geographical area (e.g., based on a zip code) and/or specific radio head using customer analytics. Moreover, the OSS server 106 can utilize the network RAN analytics in conjunction with customer device analytics to determine the overall RAN health, specifically, the throughput available at the radio link interface and based on the overall RAN health, recommend, to the content server 108, a suitable course of action to efficiently deliver content to the UE 206. Accordingly, the content server 108 does not need to implement its own routing or disaster recovery functionalities. Moreover, the OSS server 106 can act as a central intelligence node for a one stop solution for bandwidth detection and/or alternate distribution path.

The content server 108 can receive the recommendations and be aware of the available bandwidth and/or can continue the content delivery service to the UE 206 by using different data distribution path (e.g., based on the recommendation from the OSS server 106), should be it needed (e.g., bandwidth available on current path is below a defined threshold). It is noted that the UE 206 can comprise, but is not limited to most any industrial automation device and/or consumer electronic devices, for example, a tablet computer, a digital media player, a wearable device, a digital camera, a media player, a cellular phone, a personal computer, a personal digital assistant (PDA), a smart phone, a laptop, a gaming system, set top boxes, home security systems, an IoT device, a connected vehicle, at least partially automated vehicle (e.g., drones), etc.

Figure 3:
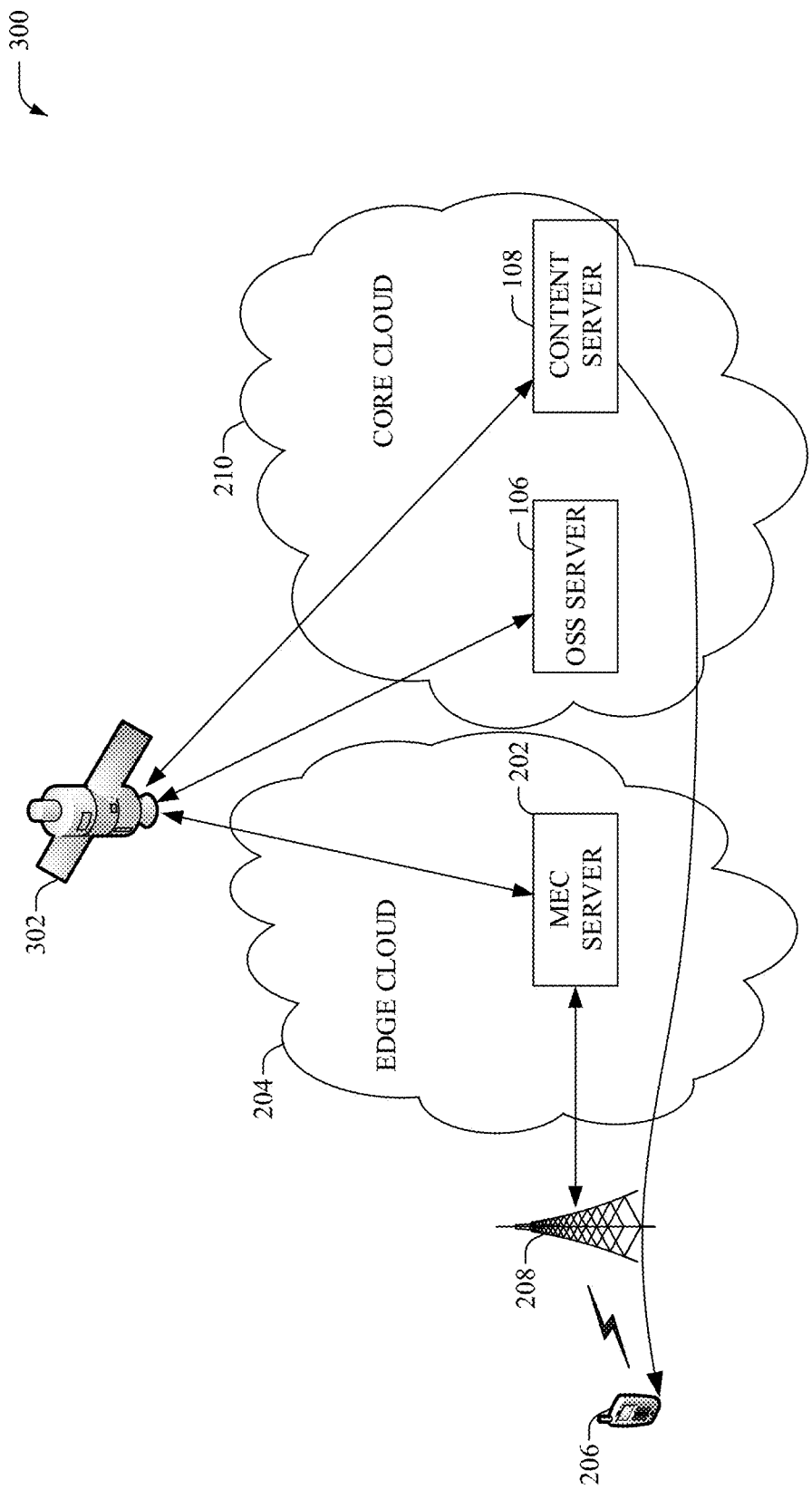
FIG. 3 illustrates an example system for controlling, via out-of-band signaling, content delivery parameters that have been determined based on RAN analytics.

Referring now to FIG. 3, there illustrated is an example system 300 for controlling, via out-of-band signaling, content delivery parameters that have been determined based on RAN analytics, in accordance with an aspect of the subject disclosure. It is noted that the OSS server 106, content server 108, MEC server 202, edge cloud 204, UE 206, access point 208, and core cloud 210 can comprise functionality as more fully described herein, for example, as described above with regard to systems 100-200. In this example embodiment, the OSS server 106 can communicate with the MEC server 202 and/or the content server 108 via out-of-band signaling, for example, using satellite links via satellite 302. As an example, the measurement data, transmitted from the MEC server 202 to the OSS server 106, can be included within a 16-bit receive window field of a TCP header that is used for flow for control. Further, the recommendation data, transmitted from the OSS server 106 to the content server 108, can be included within a 16-bit window size field of a TCP header that is used for flow for control. As an example, the window size field is reserved for indicating a maximum amount of received data, in bytes, that can be buffered at one time on the receiving side of a connection.

In one aspect, the MEC server 202 can transfer the RAN analytics data directly to the content server 108 via out-of-band signaling (e.g., using satellite links via satellite 302) under the control of the OSS server 106. As an example, the RAN analytics data can be included within a 16-bit window size field of a TCP header that is used for flow for control. Although FIG. 3 depicts an embodiment wherein the OSS server 106 communicates with the MEC server 202 and the content server 108 via satellite signals, it can be appreciated that the subject disclosure is not so limited and that in some embodiments the OSS server 106 can communicate with the MEC server 202 via in-band signaling while communicating with the content server 108 via out-of-band signaling, or communicate with the MEC server 202 via out-of-band signaling while communicating with the content server 108 via in-band signaling.

Figure 4:
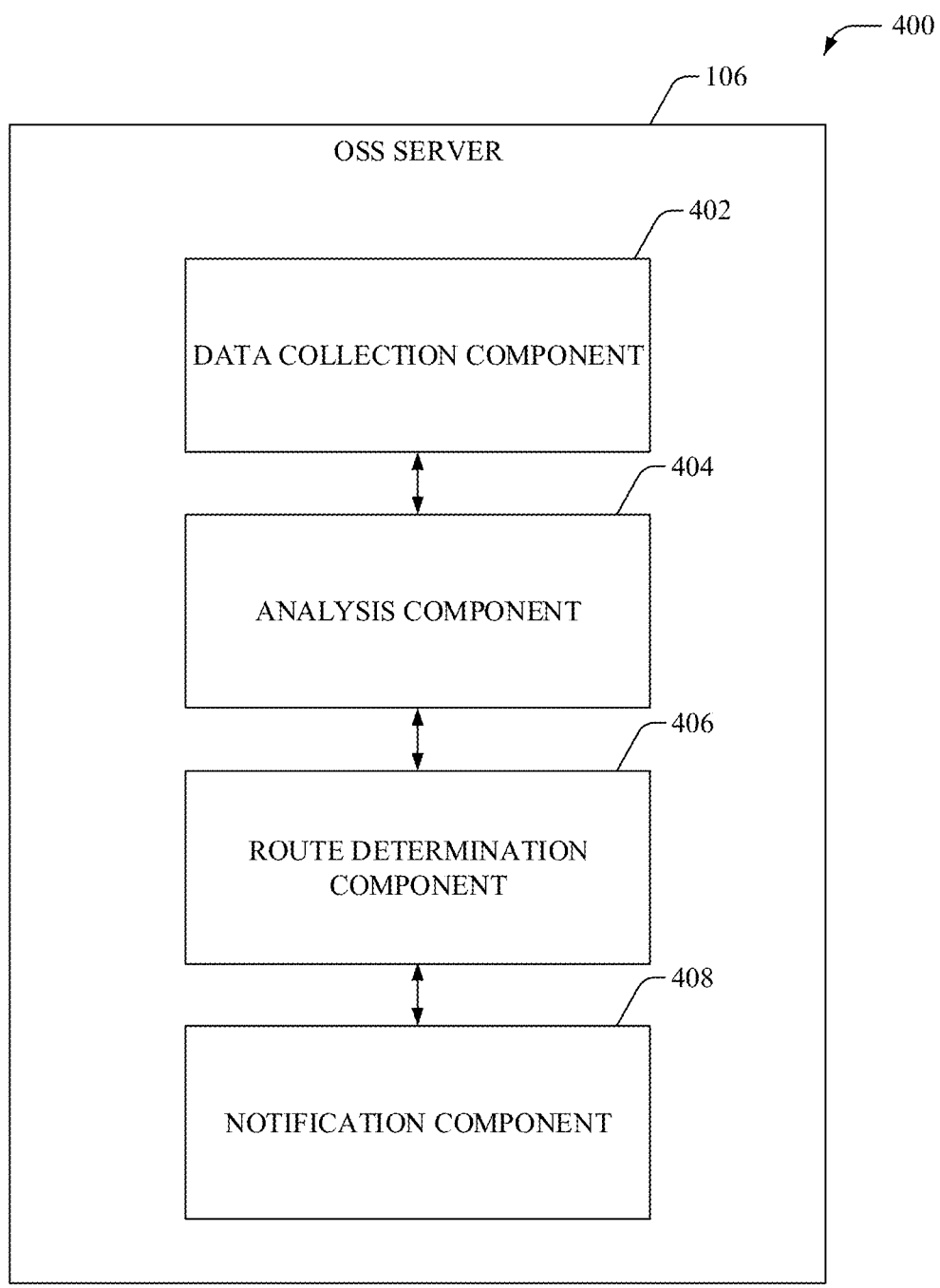
FIG. 4 illustrates an example system comprising a central analytics server that provides, to content servers, guidance data that can be utilized to optimize a transmission of a content delivery service.

Referring now to FIG. 4, there illustrated is an example system 400 that comprises a central analytics server (e.g., OSS server 106) that provides, to content servers, guidance data that can be utilized to improve and/or optimize a transmission of a content delivery service, according to an aspect of the subject disclosure. It is noted that the OSS server 106 can comprise functionality as more fully described herein, for example, as described above with regard to systems 100-300.

In one aspect, a data collection component 402 can be utilized to receive measurement data determined by one or more MEC servers (e.g., MEC servers 102) associated with one or more RANs. As an example, the data collection component 402 can receive the measurement data in a push and/or pull configuration, periodically, during a defined time interval, in response to an event (e.g., a request for content delivery transmitted by a UE, initiation and/or establishment of a content delivery session, etc.), etc. In one aspect, the data collection component 402 can request the MEC servers to track specific parameters. Typically, the measurement data can include most any information related to RAN health, QoS, bandwidth utilization and/or availability, capacity, throughput, etc. at the radio downlink interface for a UE. According to an embodiment, the data collection component 402 can receive the measurement data via in-band and/or out-of-band (e.g., satellite links) communication (e.g., to support disaster recovery). As an example, a TCP header segment's 16-bit window size field (e.g., that is typically utilized to provide a size of the receive window) can comprise the measurement data.

An analysis component 404 can be utilized to aggregate the received data and evaluate the aggregated data to determine if any changes are to be made to optimize a content delivery session, for example, to ensure QoS and/or QoE criteria is met. As an example, the optimization can comprise, but is not limited to, adapting data transmission parameters for the content delivery session (e.g., media rate selection, video/audio rate adaptation, transcoding, etc.), determining an optimal start time for initiating the content delivery and/or an optimal time period during which the content is to be delivered (e.g., based on determining that bandwidth availability estimated at the optimal start time/time period satisfies a defined bandwidth criterion), selecting an optimal format for the content, etc. As an example, the analysis component 404 can determine the changes based on various factors, such as, but not limited to, RAN health, connection availability, bandwidth availability/usage, capacity availability and/or RAN load, UE analytics, type of content, etc.

In one embodiment, a route determination component 406 can be utilized to determine an optimal path for routing the content delivery session from the content server to the UE. As an example, the route determination component 406 can verify if the determined bandwidth (and/or other RAN parameters) satisfy a low bandwidth criterion (e.g., determine is the available bandwidth is less than a defined threshold associated with the QoS/QoE). If the determined bandwidth does not satisfy the low bandwidth criterion (e.g., the available bandwidth is greater than or equal to the defined threshold), the route determination component 406 can recommend that the current and/or default communication path be utilized for content delivery. Alternatively, if the determined bandwidth satisfies the low bandwidth criterion (e.g., the available bandwidth is less than the defined threshold), the route determination component 406 can recommend that an alternate communication path (e.g., via satellite links, powerline links, cable links, etc.) be utilized for content delivery. Since the OSS server 106 has a global view of the network and its interfaces and/or availability, the OSS server 106 can store information (e.g., availability, bandwidth, capacity, etc.) associated with one or more alternate communication paths, including wireless, cable, powerline or satellite. The alternate communication path can provide the content server an option to continue service delivery to the UE and maintain the SLA.

Further, a notification component 408 can be utilized to transmit recommendation data (e.g., determined bandwidth availability, updates to content delivery parameters, alternate routing information, etc.) to a content server. According to an embodiment, the notification component 408 can transmit the recommendation data via in-band and/or out-of-band (e.g., satellite links) communication (e.g., to support disaster recovery). As an example, a TCP header segment's 16-bit window size field (e.g., that is typically utilized to provide a size of the receive window) can comprise the recommendation data. The content server can then perform the action based the information conveyed in the TCP header. For example, the content server can adjust the data transmission to the user device to maintain the defined QoS associated with the content delivery session or can utilize the alternate route to continue the content delivery to conform the SLA.

Figure 5:
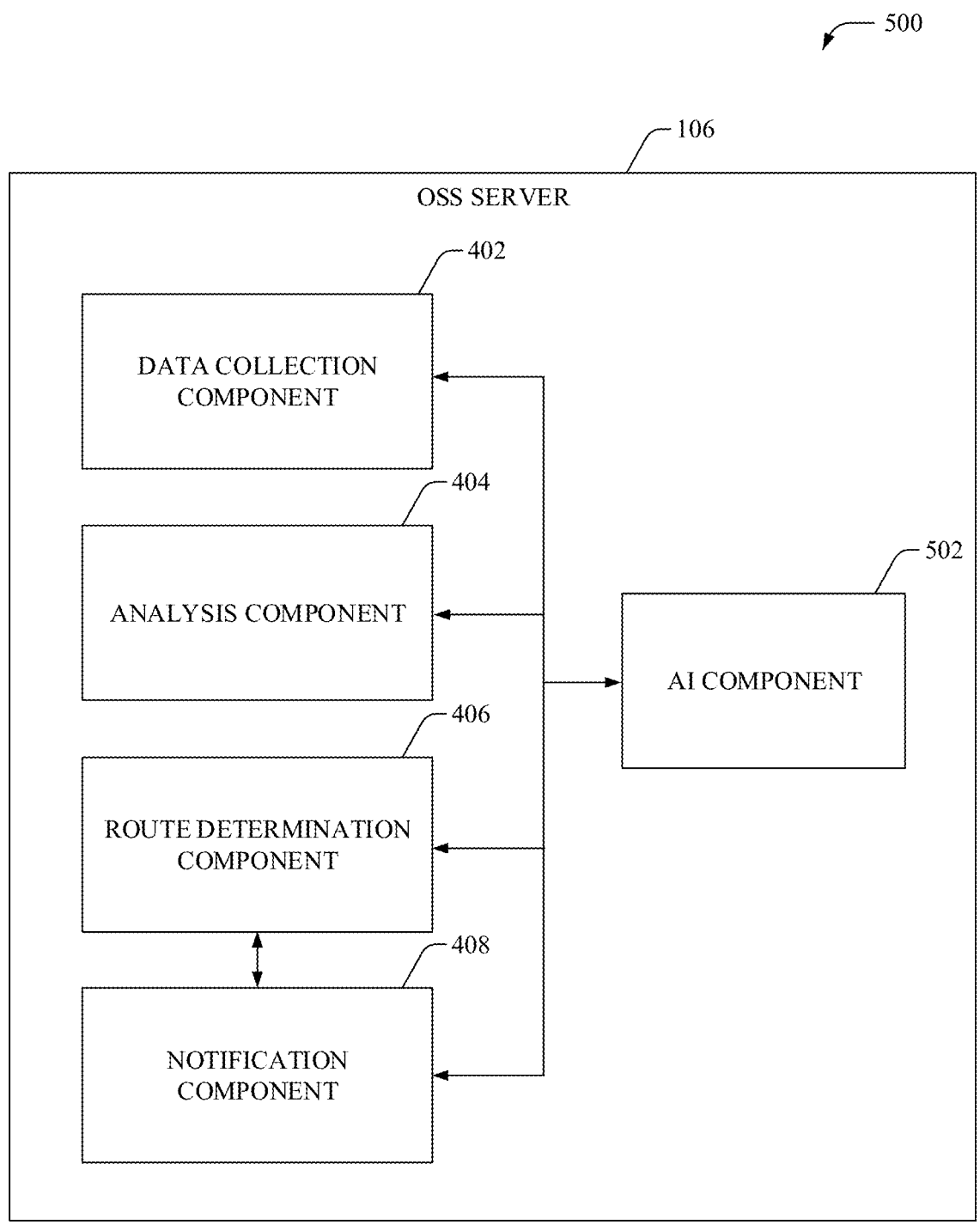
FIG. 5 illustrates an example system that facilitates automating one or more features in accordance with the subject embodiments.

Referring now to FIG. 5, there illustrated is an example system 500 that employs an artificial intelligence (AI) component 502 to facilitate automating one or more features in accordance with the subject embodiments. It can be noted that the OSS server 106, data collection component 402, analysis component 404, route determination component 406, and notification component 408 can comprise functionality as more fully described herein, for example, as described above with regard to systems 100-400.

In an example embodiment, system 500 (e.g., in connection with predicting bandwidth availability, recommended actions to optimize content delivery, an alternate route for content delivery, etc.) can employ various AI-based schemes (e.g., intelligent processing/analysis, machine learning, etc.) for carrying out various aspects thereof. For example, a process for determining which functions to monitor, determining requirements for a service, determining how to process raw data, determining criterion and/or thresholds for scaling, etc., can be facilitated via an automatic classifier system implemented by AI component 502.

Moreover, the AI component 502 can exploit various artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, AI component 502 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 502 can be used to automatically learn and perform a number of functions, comprising but not limited to determining according to a predetermined criterion, the bandwidth availability during a defined time period, updates to data transmission parameters, a communication path for optimized content delivery, etc. The criteria can comprise, but is not limited to, historical patterns and/or trends, network operator preferences and/or policies, content/service provider preferences, predicted traffic flows, event data, latency data, reliability/availability data, current time/date, service requirements/characteristics, real-time resource consumption, UE characteristics, UE category, UE behavior and/or motion data, type of content, and the like.

Figure 6:
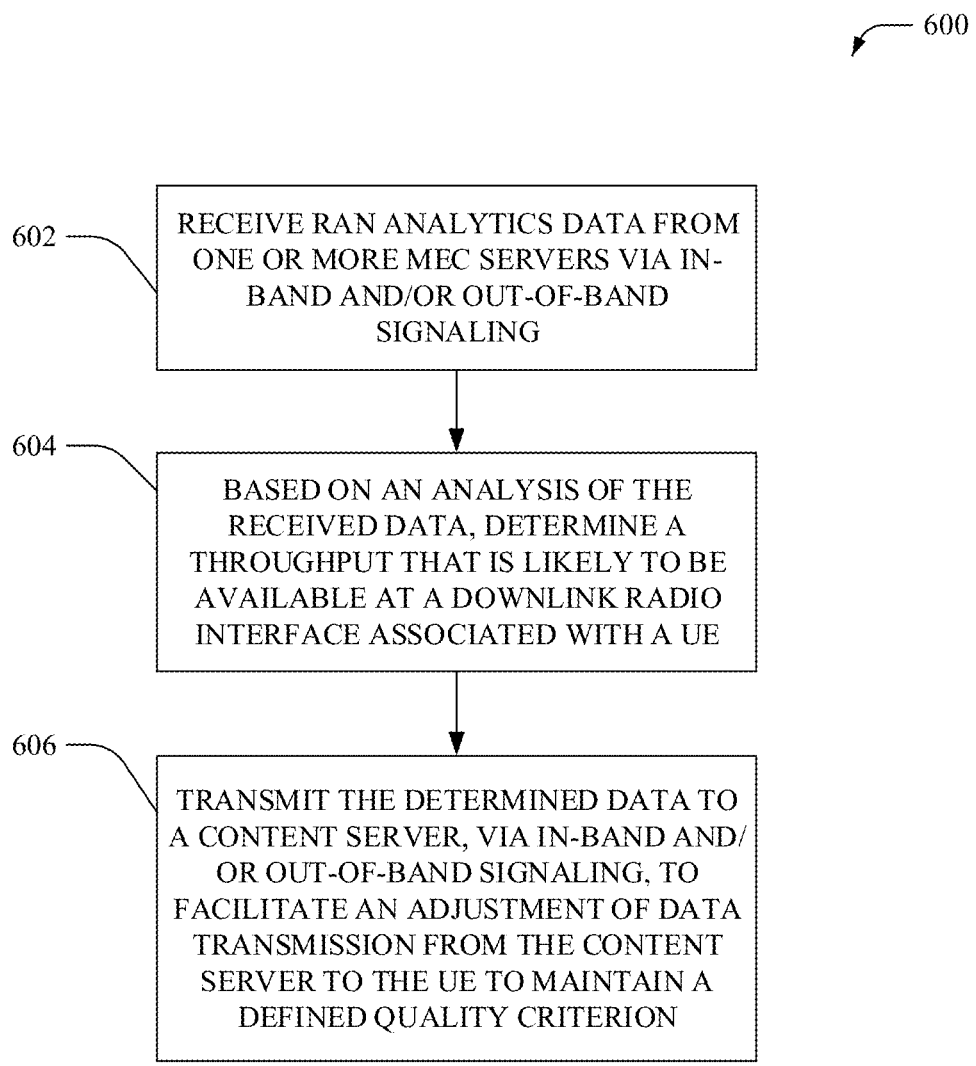
FIG. 6 illustrates an example method that facilitates adjustment of a data transmission from a content server based on throughput availability that is conveyed to the content server via in-band and/or out-of-band signaling.
Figure 7:
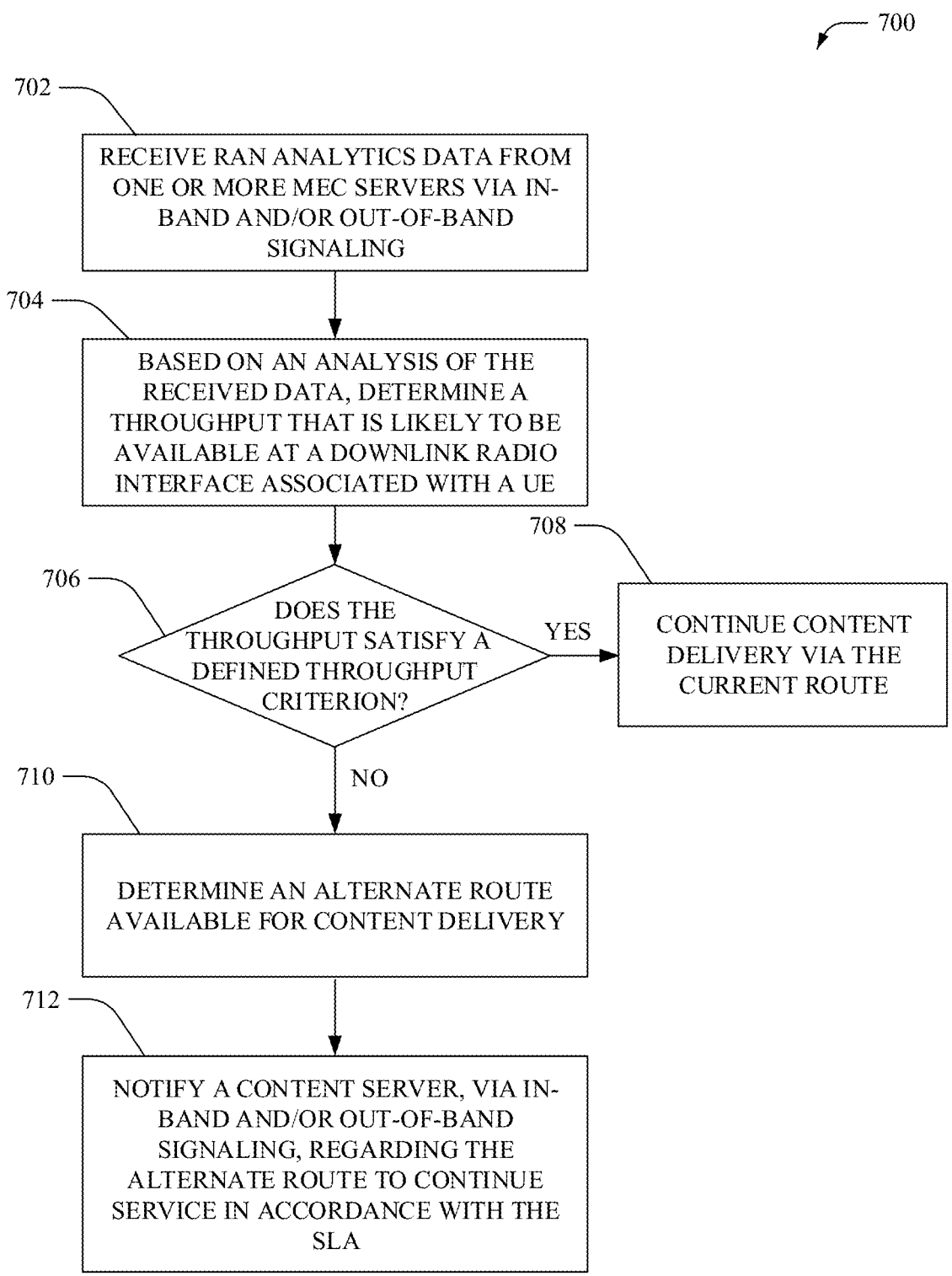
FIG. 7 illustrates an example method for determining alternate routes for content delivery, according to an aspect of the subject disclosure.
Figure 8:
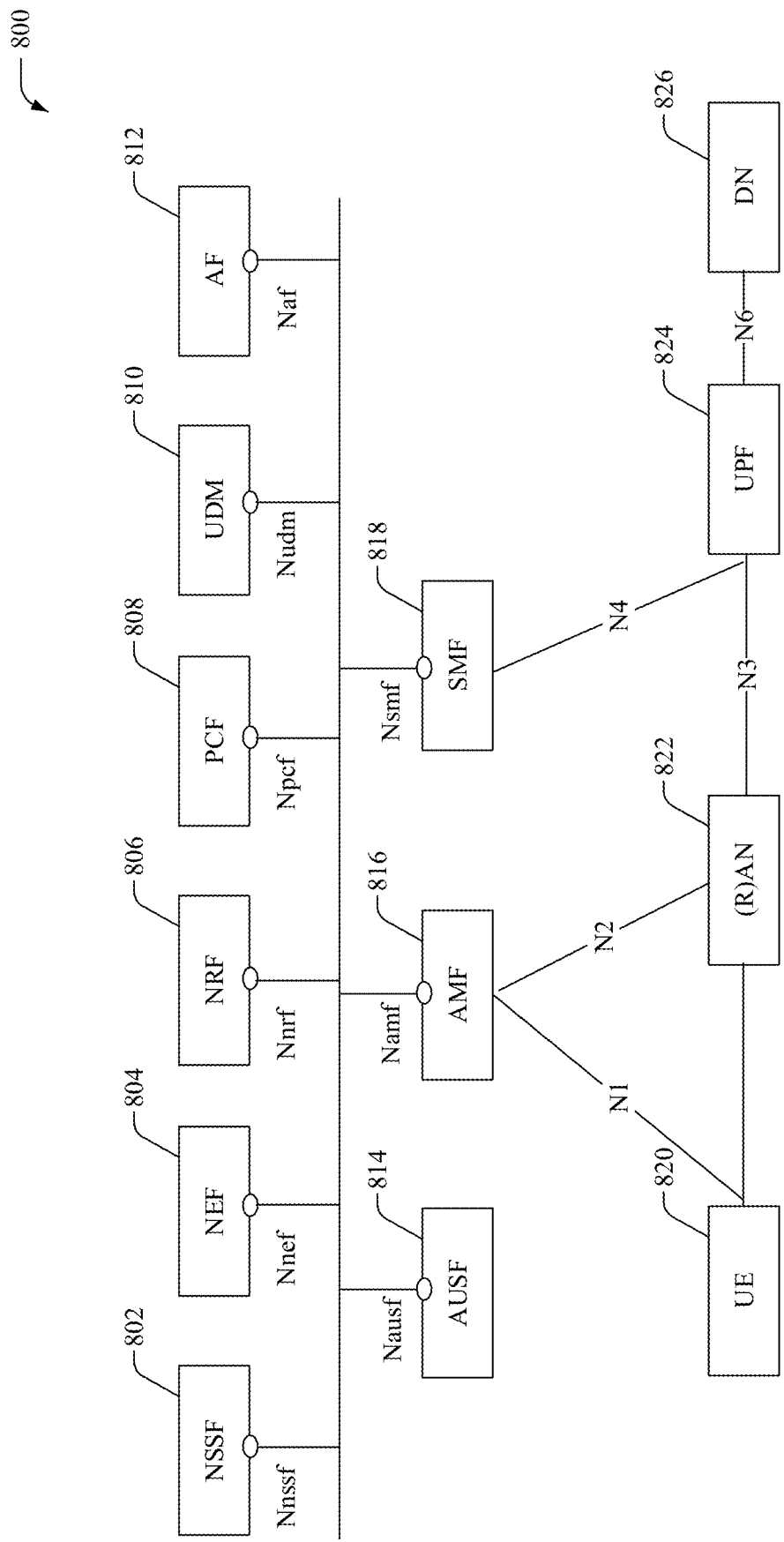
FIG. 8 illustrates an example system that depicts a service-based 5G network architecture operable to execute the disclosed embodiments.

FIGS. 6-8 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 6 there illustrated is an example method 600 that facilitates adjustment of a data transmission from a content server based on throughput availability that is conveyed to the content server via in-band and/or out-of-band signaling, according to an aspect of the subject disclosure. In an aspect, method 600 can be implemented by one or more network devices (e.g., OSS server 106) of a communication network (e.g., mobility network). At 602, RAN analytics data can be received from one or more MEC servers via in-band and/or out-of-band signaling. As an example, the RAN analytics data can comprise, but is not limited to RAN health, QoS, bandwidth utilization and/or availability, capacity, throughput, etc. associated with the radio downlink interface for a UE. In an aspect, the RAN analytics data can be received via a 16-bit window size field (e.g., reserved for indicating a size of the receive window) of the TCP header that is typically utilized for flow control data. Moreover, the RAN analytics data can be received via in-band and/or out-of-band (e.g., satellite) communication and can thus support disaster recovery logic.

At 604, based on an analysis of the received data, a throughput that is likely to be available at the radio downlink interface (e.g., during a defined time period) can be determined. As an example, determination can be facilitated via machine learning. In one aspect, the throughput can be utilized to determine changes that are to be made to data transmission of a content delivery session to, for example, improve the QoS/QoE. Further, at 606, the determined data (e.g., throughput and/or changes) can be transmitted to a content server via in-band and/or out-of-band (e.g., satellite) communication to facilitate the adjustment of one or more data transmission parameters, for example, to maintain a defined quality criterion. As an example, the determined data can be transmitted to the content server via a 16-bit window size field (e.g., reserved for indicating a size of the receive window) of the TCP header that is typically utilized for flow control data.

FIG. 7 illustrates an example method 700 for determining alternate routes for content delivery, according to an aspect of the subject disclosure. In an aspect, method 700 can be implemented by one or more network devices (e.g., OSS server 106) of a communication network (e.g., mobility network). At 702, RAN analytics data can be received from one or more MEC servers via in-band and/or out-of-band signaling. As an example, the RAN analytics data can comprise, but is not limited to RAN health, QoS, bandwidth utilization and/or availability, capacity, throughput, etc. associated with the radio downlink interface for a UE. In an aspect, the RAN analytics data can be received via a 16-bit window size field (e.g., reserved for indicating a size of the receive window) of the TCP header that is typically utilized for flow control data. Moreover, the RAN analytics data can be received via in-band and/or out-of-band (e.g., satellite) communication and can thus support disaster recovery logic.

At 704, based on an analysis of the received data, a throughput that is likely to be available at the radio downlink interface (e.g., during a defined time period) can be determined. As an example, determination can be facilitated via machine learning. Further, at 706, it can be determined whether the throughput satisfies a defined throughput criterion (e.g., if the throughput is greater than a minimum throughput required for content delivery with a defined QoS). If determined that the throughput satisfies the defined throughput criterion, then at 708, content delivery can be performed via the current data transmission route/path. Alternatively, if determined that the throughput does not satisfy the defined throughput criterion, then at 710, an alternate route that is available for content delivery (e.g., having a throughput that satisfies the throughput criterion) can be determined. In one example, the alternate route can utilize different communication technologies than the current data transmission path. At 712, a content server can be notified regarding the alternate route via in-band and/or out-of-band (e.g., satellite) communication, for example, to enable service continuity in accordance with a SLA. As an example, the alternate route data can be transmitted to the content server via the 16-bit window size field (e.g., reserved for indicating a size of the receive window) of the TCP header that is typically utilized for flow control data.

Figure 9:
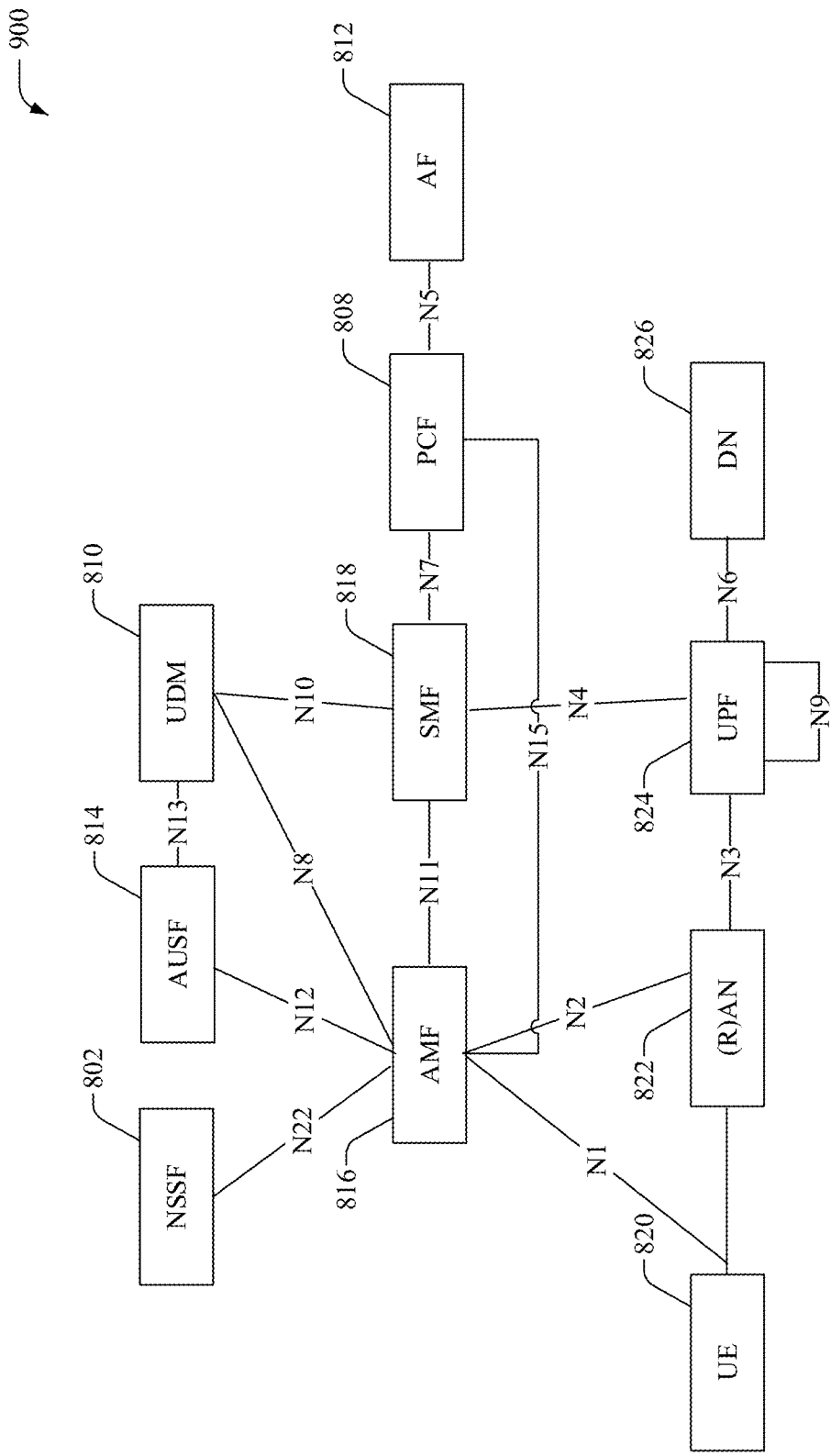
FIG. 9 illustrates an example system that depicts a non-roaming 5G system architecture in reference point representation that is operable to execute the disclosed embodiments.

Aspects and embodiments disclosed herein can be implemented in next generation networks, for example, 5G networks. The 5G network architecture is defined as service-based and the interaction between network functions can be represented as shown in FIGS. 8-9. FIG. 8 illustrates an example system 800 that depicts a service-based network architecture, according to an aspect of the subject disclosure. In an aspect, system 800 depicts service-based interfaces being used within the control plane. For example, one network function (NF) (e.g. access and mobility management function (AMF) 816) within the control plane can allows other NFs (e.g., network slice selection function (NSSF) 802, network exposure function (NEF) 804, network repository function (NRF) 806, policy control function (PCF), 808, user data management (UDM) 810, application function (AF) 812, authentication server function (AUSF) 814, session management function (SMF) 818, user plane function (UPF) 824, etc.) that have been authorized, to access its services. This representation also includes point-to-point reference points between the NFs where necessary (e.g., between AMF 816 and UE, 820/(R)AN 822, SMF 818 and UPF 824, (R)AN 822 and UPF 824, UPF 824 and data network (DN) 826).

In an aspect, the AMF 816 can support termination of non-access stratum (NAS) signaling, NAS ciphering and integrity protection, registration management, connection management, mobility management, access authentication and authorization, security context management, etc. The SMF 818 can support session management (e.g., session establishment, modification, release, etc.), UE IP address allocation and management, dynamic host configuration protocol (DHCP) functions, termination of NAS signaling related to session management, downlink (DL) data notification, traffic steering configuration for UPF 824 for proper traffic routing, etc. Further, the UPF 824 can support packet routing and forwarding, packet inspection, QoS handling, can act as external protocol data unit (PDU) session point of interconnect to DN 826, and can be anchor point for intra- and inter-radio access technology (RAT) mobility. A PCF 808 can support unified policy framework, provide policy rules to control plane functions, access subscription information for policy decisions in a unified data repository (UDR), etc. Additionally, the AUSF 814 can comprise an authentication server that authenticates UE 820.

In an aspect, the UDM 810 can support generation of authentication and key agreement (AKA) credentials, user identification handling, access authorization, subscription management, etc. The AF 812 can support application influence on traffic routing, accessing NEF 804, interaction with policy framework for policy control, etc. Further, the NEF 804 can support exposure of capabilities and events, secure provision of information from external application to 3GPP network, translation of internal/external information, etc. Furthermore, the NRF 806 can support service discovery function, maintains NF profile and available NF instances, etc. According to an embodiment, the NSSF 802 can support selecting of the network slice instances to serve the UE 820 that registers via (radio) access network ((R)AN) 822, determining the allowed network slice selection assistance information (NSSAI), determining the AMF (e.g., AMF 816) set to be used to serve the UE, etc.

FIG. 9 illustrates an example system 900 that depicts a non-roaming 5G system architecture in reference point representation, according to an aspect of the subject disclosure. In one aspect, system 900 focuses on the interactions between pairs of network functions defined by point-to-point reference point (e.g. N7) between any two network functions. This kind of representation is used when some interaction exists between any two network functions. It is noted that NSSF 802, PCF, 808, UDM 810, AF 812, AUSF 814, AMF 816, SMF 818, UE 820, (R)AN 822, UPF 824, and DN 826, can comprise functionality as more fully described herein, for example, as described above with regard to system 800. It should be noted that although various aspects and embodiments have been described herein in the context of 5G networks, the disclosed aspects are not limited to 5G technology and can be applied to other future wireless communication technologies and their evolutions.

Figure 10:
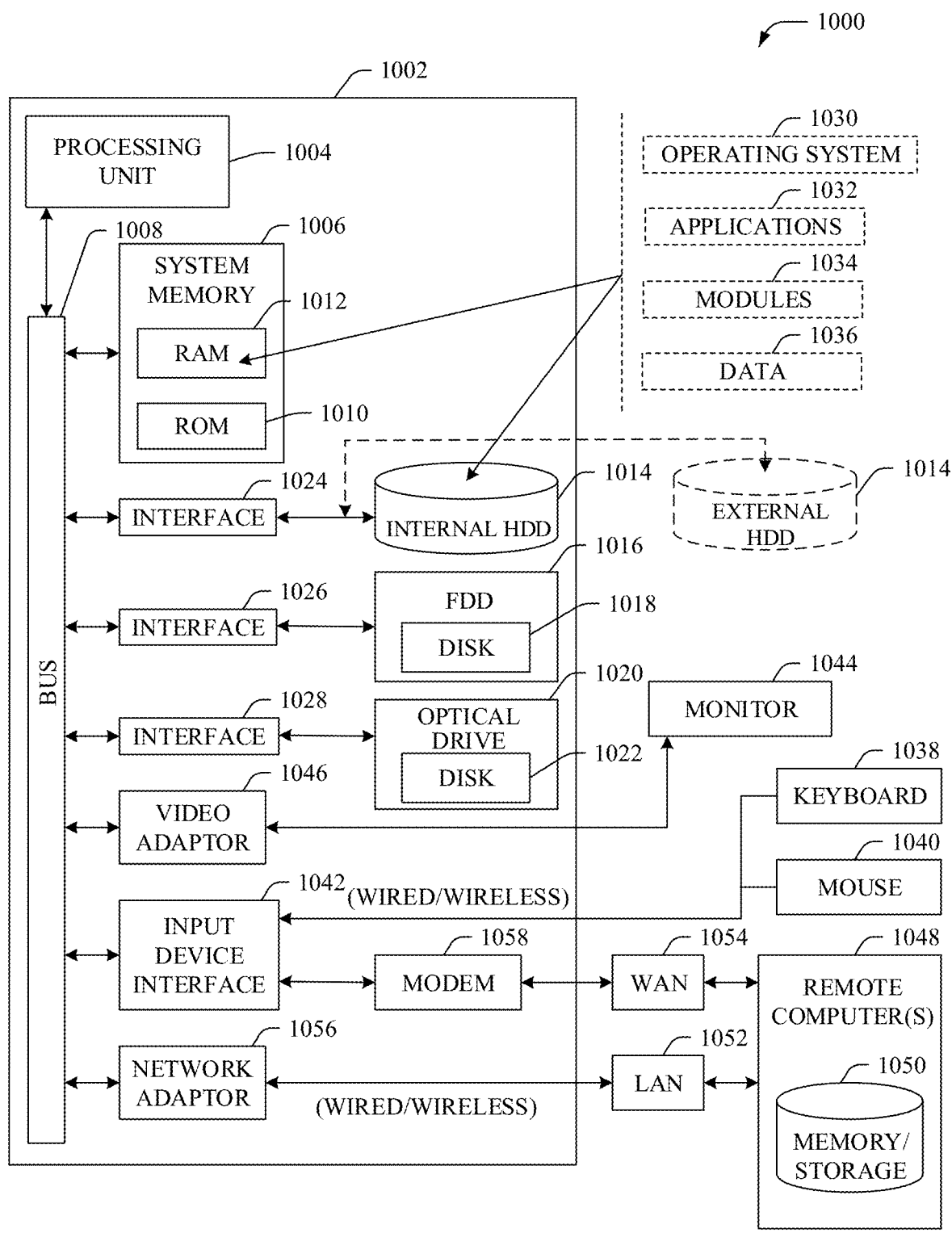
FIG. 10 illustrates a block diagram of a computer operable to execute the disclosed communication architecture.

Referring now to FIG. 10, there is illustrated a block diagram of a computer 1002 operable to execute the disclosed communication architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 10, the example environment 1000 for implementing various aspects of the specification comprises a computer 1002, the computer 1002 comprising a processing unit 1004, a system memory 1006 and a system bus 1008. As an example, the component(s), application(s) server(s), equipment, system(s), interface(s), gateway(s), controller(s), node(s), entity(ies), function(s), point(s), cloud(s) and/or device(s) (e.g., MEC servers 102, RAN analytics component 104, OSS server 106, content server(s) 108, MEC server 202, edge cloud 204, UE 206, access point 208, core cloud 210, satellite 302, data collection component 402, analysis component 404, route determination component 406, notification component 408, AI component 502, NSSF 802, NEF 804, NRF 806, PCF, 808, UDM 810, AF 812, AUSF 814, AMF 816, SMF 818, UE 820, (R)AN 822, UPF 824, and DN 826, etc.) disclosed herein with respect to systems 100-5 and 800-900 can each comprise at least a portion of the computer 1002. The system bus 1008 couples system components comprising, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. It is noted that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an infrared (IR) interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also comprise a wireless access point disposed thereon for communicating with the wireless adapter 1056.

When used in a WAN networking environment, the computer 1002 can comprise a modem 1058, or is connected to a communications server on the WAN 1054 or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be noted that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
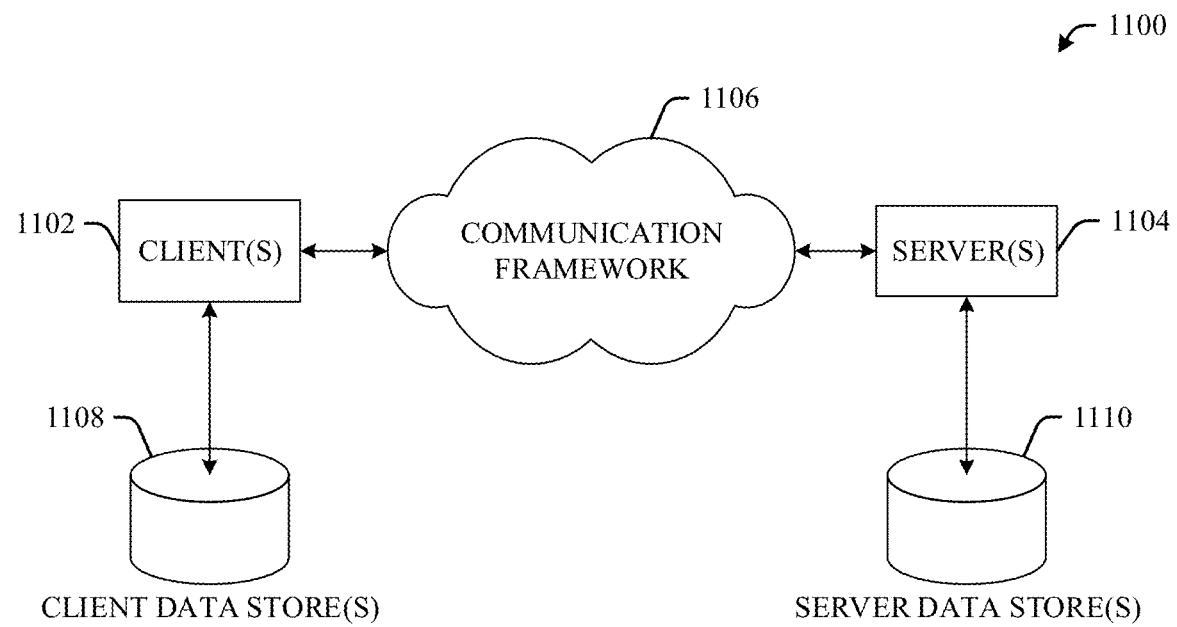
FIG. 11 illustrates a schematic block diagram of a computing environment in accordance with the subject specification.

Referring now to FIG. 11, there is illustrated a schematic block diagram of a computing environment 1100 in accordance with the subject specification. The system 1100 comprises one or more client(s) 1102. The client(s) 1102 can be hardware and/or software (e.g., threads, processes, computing devices).

The system 1100 also comprises one or more server(s) 1104. The server(s) 1104 can also be hardware and/or software (e.g., threads, processes, computing devices). The servers 1104 can house threads to perform transformations by employing the specification, for example. One possible communication between a client 1102 and a server 1104 can be in the form of a data packet adapted to be transmitted between two or more computer processes. The data packet may comprise a cookie and/or associated contextual information, for example. The system 1100 comprises a communication framework 1106 (e.g., a global communication network such as the Internet, cellular network, etc.) that can be employed to facilitate communications between the client(s) 1102 and the server(s) 1104.

Communications can be facilitated via a wired (comprising optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A method, comprising:
   in response to determining that analytics data, received from network edge equipment, indicates an available throughput of a radio downlink interface configured to deliver content to a user equipment that is below a throughput criterion, determining, by a system comprising a processor, route data that indicates an alternate route to deliver the content to the user equipment; and
   transmitting, by the system, the route data to a content server that provides the content via out-of-band signaling, wherein the alternate route is configured by the content server to transfer the content in accordance with term data representative of a service level agreement.

2. The method of claim 1, wherein the analytics data is received within a window size field of a transmission control protocol header segment that has been reserved to indicate a size of a receive window of time.

3. The method of claim 1, wherein the transmitting comprises transmitting the route data within a window size field of a transmission control protocol header segment that has been reserved to indicate a size of a receive window of time.

4. The method of claim 1, wherein the analytics data comprises quality of service data.

5. The method of claim 1, wherein the analytics data comprises a performance parameter associated with delivery of the content.

6. The method of claim 1, further comprising:
   storing, by the system, information that indicates respective bandwidth availabilities associated with alternate routes that are configured to deliver the content from the content server to the user equipment, and wherein the alternate route is selected from the alternate routes based on the information.

7. The method of claim 1, wherein the alternate route comprises a route that utilizes satellite communication.

8. A system, comprising:
   a processor; and
   a memory that stores executable instructions that, when executed by the processor, facilitate performance of operations, comprising:
      in response to determining that analytics data, received from edge equipment, indicates an available throughput of a radio downlink interface configured to deliver content to a user equipment that does not satisfy a throughput criterion, determining route data that indicates an alternate route to deliver the content to the user equipment; and
      transmitting the route data to a content server that provides the content via out-of-band signaling, wherein the alternate route is configured by the content server to transfer the content in accordance with agreement data representative of a service level agreement applicable to the user equipment.

9. The system of claim 8, wherein the analytics data is received within a window size field of a transmission control protocol header segment that has been reserved to indicate a size of a receive window of time.

10. The system of claim 8, wherein the transmitting comprises transmitting the route data within a window size field of a transmission control protocol header segment that has been reserved to indicate a size of a receive window of time.

11. The system of claim 8, wherein the analytics data comprises quality of service data.

12. The system of claim 8, wherein the analytics data comprises a performance parameter associated with delivery of the content.

13. The system of claim 8, wherein the operations further comprise:
    storing information that indicates respective bandwidth availabilities associated with alternate routes that are configured to deliver the content from the content server to the user equipment, and wherein the alternate route is selected from the alternate routes based on the information.

14. The system of claim 8, wherein the alternate route comprises a route that utilizes satellite communication.

15. A non-transitory machine-readable medium, comprising executable instructions that, when executed by a processor, facilitate performance of operations, comprising:

in response to determining that analytics data, obtained via an edge device, indicates an available throughput of a radio downlink interface configured to deliver content to a user equipment that is below a minimum throughput criterion, determining route data that indicates an alternate route to deliver the content to the user equipment; and transmitting the route data to a content server that provides the content via out-of-band signaling, wherein the alternate route is configured by the content server to transfer the content in accordance with a service level agreement.

16. The non-transitory machine-readable medium of claim 15, wherein the analytics data is received within a window size field of a transmission control protocol header segment that has been reserved to indicate a size of a receive window of time.

17. The non-transitory machine-readable medium of claim 15, wherein the transmitting comprises transmitting the route data within a window size field of a transmission control protocol header segment that has been reserved to indicate a size of a receive window of time.

18. The non-transitory machine-readable medium of claim 15, wherein the analytics data comprises quality of service data.

19. The non-transitory machine-readable medium of claim 15, wherein the analytics data comprises a performance parameter associated with delivery of the content.

20. The non-transitory machine-readable medium of claim 15, wherein the operations further comprise:

storing information that indicates respective bandwidth availabilities associated with alternate routes that are configured to deliver the content from the content server to the user equipment, and wherein the alternate route is selected from the alternate routes based on the information.

* * * * *